UNITED STATES PATENT OFFICE.

EMIL HAUSSMANN, OF TREPTOW, NEAR BERLIN, GERMANY, ASSIGNOR TO ACTIEN GESELLSCHAFT FÜR ANILIN FABRIKATION, OF BERLIN, GERMANY.

COMPOUND OF SULFUR DYES SOLUBLE IN WATER.

953,008.  Specification of Letters Patent.  Patented Mar. 22, 1910.

No Drawing.  Application filed February 4, 1909. Serial No. 476,182.

*To all whom it may concern:*

Be it known that I, EMIL HAUSSMANN, citizen of the German Empire, residing at Treptow, near Berlin, Germany, (and whose post-office address is Coepenicker Landstrasse 49, Treptow, near Berlin,) have invented certain new and useful Improvements in New Compounds of Sulfur Dyes Soluble in Water, of which the following is a specification.

My present invention relates to the manufacture of new compounds of sulfur dyestuffs soluble in water. These new compounds are obtained by the action of a suitable oxidizing agent on the aqueous solution of sulfur dyestuffs which are obtained by dissolving a sulfur dyestuff in water with the addition of a sulfite of an alkali. On introducing a current of air into such an aqueous solution the sulfur dyestuffs are not precipitated as was the next to be expected, because the sulfite is converted into sulfate, but while the coloration of the solution is strongly altered and darkened new compounds are formed which dye neither wool nor cotton. These substances may be isolated by evaporating the solution; and as they are very easily dissolved in water they may also be offered for commercial purposes in the form of a highly concentrated solution. This result is very surprising because according to literature the heretofore known sulfite-compounds of sulfur-dyestuffs, which are taken as leuco-compounds (compare German patent 146,797) or as thiosulfonic acids (compare English Letters Patent 15,413/00 and 16,414/00), are described as slightly colored compounds which according to German patents 88,392, 91,720 and 94,501 directly dye cotton and according to French patent 303,524 can be fixed on wool.

My new compounds, which do not dye either cotton or wool are especially fit for dyeing leather and most suitable for dyeing the so-called chrome-leather; for this purpose they are used in the form of an aqueous solution with the addition of a small proportion of a mineral acid, such as sulfuric acid, or of an organic acid, such as formic acid. When adding to an aqueous solution of these products a salt of a metal, such as copper, lead, barium, aluminium and the like, deeply colored lakes are obtained which can be used for dyeing paper and the like.

As oxidizing agents for the purpose of my present invention I find atmospheric air especially suitable, but other agents which will convert sodium sulfite into sodium sulfate, such as for example hydrogen peroxid, sodium hypochlorite, ammonium-persulfate and the like, may aso be employed.

The following examples may serve to illustrate my invention, the parts being by weight:

1. 1000 parts of sulfur blue L extra are treated with boiling water in order to eliminate the inorganic soluble salts and after filtering the residue is dissolved in 9000 parts of boiling water with the addition of 1500 parts of crystallized sodium sulfite, a current of air being blown through the mass at the same time. The treatment of the boiling solution with air is continued until the coloration of the solution does not change further. The solution is then filtered to eliminate any small quantities of insoluble products and the filtrate evaporated. The product thus obtained produces from an aqueous solution containing a small proportion of an acid dark blue shades on leather.

2. 1000 parts of sulfur black A extra in the form of moist press-cake, as it is obtained for instance by blowing a current of air through the mass of reaction and draining is introduced while stirring into 1250 parts of boiling water; to this mass are added 1250 parts of crystallized sodium sulfite whereupon boiling is continued until the dyestuff has dissolved. The solution thus obtained, which is dirty green and on the addition of diluted sulfuric acid is totally precipitated yielding a brown-gray precipitate, is further treated with air and then assumes a more bluish coloration which gradually increases to blue and deepens. When the change of the color ceases the mass is diluted with water up to 3000 parts. The solution thus obtained may be offered for commercial purposes. By evaporating the solution as above obtained, the new product is obtained which, when pulverized, appears as a black powder which easily dissolves in water to a deep blue-black colored solution. This solution in a rather dilute form has a greenish blue shade which on the addition of dilute sulfuric acid is not precipitated but turns to red-blue. This new product does not dye either a vegetable or an animal fiber even if an alkali or an acid or a usual neutral salt has been added to the aqueous solution but with the addition of sufficient acid dyes leather, and more especially the so-called chrome-leather, black shades. This new compound when dyed with the addition of an alkali sulfid has, compared with the original product, only a relatively very small affinity to the vegetable fiber. In aqueous solution it eliminates sulfurous acid on the addition of a mineral acid. If dissolved in water deeply colored lakes are obtained by the addition of a salt of copper, lead, barium, aluminum and like metals, which lakes are suitable for example for coloring paper or like purposes.

3. 100 parts of immedial-black V extra are mixed with boiling water and precipitated by adding a suitable proportion of diluted sulfuric acid. The resulting product is drained, washed with water and then introduced into an aqueous solution of 100 parts of neutral sodium sulfite in 1000 parts of water. After having boiled for about 5 hours the small quantity of undissolved dyestuff is separated by filtering, and a bottle-green and rather slightly colored solution results which on the addition of hydrogen peroxid assumes immediately a deep blue color and which by the addition of an acid is not precipitated. Into the warm solution a current of air is introduced until the intensity of the color no longer increases and no further change of tint occurs. The solution is then evaporated to dryness. The dyestuff thus obtained dissolves very easily even in cold water and still more easily in boiling water to a deep blue solution which after sufficient dilution becomes violet on addition of dilute sulfuric acid without formation of any precipitate.

Of course my present invention is not limited to the foregoing examples or to the details given therein. Thus for instance instead of the sulfur dyestuffs named in the foregoing examples other sulfur dyestuffs of the various kinds of this special group of dyestuffs may be used in carrying out the new process without departing from the scope of my invention; as examples of such other dyestuffs I may mention by way of example the different commercial marks of sulfur black, among others sulfur black T extra, 2 B extra, 4 B extra, or other black sulfur dyestuffs well known under the tradename of immedial black, katigen black, thiogen black, thiophenol black, thion black, thioxin black and the like. Furthermore such blue or yellow or green sulfur dyestuffs which are soluble in sodium sulfite may be employed instead of the dyestuffs used in the foregoing examples.

It is obvious to those skilled in the art that when using such other dyestuffs in carrying out my present invention the special conditions of reaction must be altered in order to obtain the best results with my new process, the characteristic feature of my process being the action of a sulfite of an alkali and of an oxidizing agent, simultaneously or successively, on a sulfur dyestuff preferably in a concentrated form, which concentrated form may be obtained either by treating a commercial form of a sulfur dyestuff insoluble in water with preferably hot water in order to eliminate inorganic salts, or by separating the crude dyestuffs from the mass of reaction by diluting with water and blowing a current of air through the solution, or acidifying the solution.

For the sodium sulfite employed in the foregoing examples other normal alkali sulfites may be substituted.

Having now described my invention and the manner in which the same may be carried out what I claim is,—

1. As new articles of manufacture, the new compounds of sulfur dyestuffs soluble in water which may be obtained by the action of an alkali sulfite in connection with an oxidizing agent adapted to convert sodium sulfite into sodium sulfate, for example atmospheric air, hydrogen peroxid and the like, upon a sulfur dyestuff, these compounds when evaporated and pulverized being dark to black colored powders, the aqueous solutions of which eliminate sulfurous acid on the addition of a mineral acid, and which in an aqueous solution on the addition of an aqueous solution of a salt of copper, lead, barium, aluminum and like metals separate deeply colored lakes.

2. As a new article of manufacture, the compound of sulfur dyestuff soluble in water obtained by the action of an alkali sulfite in connection with atmospheric air upon a sulfur dyestuff and evaporating and pulverizing the dry residue, this compound being a dark to black colored powder, the aqueous solution of which eliminates sulfurous acid on the addition of a mineral acid, and which in an aqueous solution on the addition of an aqueous solution of a salt of copper, lead, barium, aluminum and like metals separates deeply colored lakes.

3. As a new article of manufacture the new compound soluble in water, which may be obtained by the action of an alkali sulfite in connection with atmospheric air upon sulfur black A extra, evaporating and pulverizing the dry residue, this new compound being a black powder, which easily dissolves in water to a deep blue colored solution, which solution in a rather dilute form shows a greenish blue tint and is not precipitated by the addition of a dilute sulfuric acid, but turns to red blue, which new compound does not dye either a vegetable or an animal fiber even if an alkali or an acid or a usual neutral salt has been added to the aqueous solution, which new compound when dyed with the addition of an alkali sulfid has, compared with the original product, only a relatively very small affinity to the vegetable fiber and which new compound in an aqueous solution eliminates sulfurous acid on the addition of a mineral acid and which new compound in an aqueous solution on the addition of an aqueous solution of a salt of copper, lead, barium, aluminum and like metals separates deeply colored lakes, which lakes are suitable for example for coloring paper and like purposes, this new compound being most suitable for dyeing leather and more especially chrome leather from an acidulated bath, by which dyeing operation deep black tints are obtained.

In testimony whereof I have hereunto set my hand in presence of two subscribing witnesses.

EMIL HAUSSMANN.

Witnesses:
 HENRY HASPER,
 WOLDEMAR HAUPT.